April 25, 1939.    R. W. GLASNER ET AL    2,155,482
DIE FITTING MACHINE
Filed March 5, 1937    8 Sheets-Sheet 7

Inventors
Rudolph W. Glasner
Einar K. Johansen
By [signature] Atty.

Patented Apr. 25, 1939

2,155,482

UNITED STATES PATENT OFFICE 2,155,482

DIE FITTING MACHINE

Rudolph William Glasner and Einar K. Johansen, Chicago, Ill.; said Johansen assignor to said Glasner Application March 5, 1937, Serial No. 129,286

14 Claims. (Cl. 76—4)

It is well known that in die fitting machines, the dies are spotted or fitted by moving one of the dies against the other, and the accepted method is to employ chalk or bluing to coat the faces that are to be fitted, before they are brought into contact.

When the two members are thus brought together the high portions will produce spots, which are then filed or ground, and this is repeated as often as necessary until all of the surfaces of the male and female dies are brought into perfect contact.

If in the beginning of the spotting operation the slide carrying one of the die members is permitted to even slightly tilt, then more than one point of contact will be produced, with the result that the operator will be filing or grinding more than one spot, instead of only the points which are protruding most, and perfect die fitting becomes a hit and miss proposition.

When a die member carrying slide is provided, which comes to a positive stop at the bottom of its stroke, beyond which it cannot move, and if these stops are independent of the obstructions offered by the high spots in the die itself, it follows that only the highest points in the die will spot, so that the operator may file or grind only the highest points.

It is one of the objects of the present invention to provide a machine of this character, in which there is also provided means whereby the slide may be thus arrested in its movement. This may be accomplished by means of suitable screws or members placed in each of the four corners of the machine and operatively connected with the slide, the crown, or the bed of the machine and adapted to engage, or to form, fixed stops, as the case may be, whereby the movement of the slide will be arrested, adjusting means being provided whereby the screws or members may be adjusted, so that the movement of the slide will not only be arrested, but the point of arrest of the slide, in the cycle of the movement thereof, may be varied or controlled.

A reading dial may also be provided, to indicate to the operator that the extent of separation between the dies has been acquired. The slide may then be moved to the bottom of its stroke, until the fixed stop or abutment is engaged, such contact occurring at the bottom of the stroke of the slide. The slide will not then be able to move any further in the same direction than to the distance to which the arresting or stopping means are set.

The operator may then file or grind off all of the spots contacted, until the slide does not produce any more contact spots, whereupon the operator may set the slide stopping means for a desired additional distance of travel of the slide, and he may continue this spotting operation until the fitting of the dies has been perfected.

In some dies there is provided an additional work aperture punch, and in order to simultaneously spot or fit all of the parts of the die, cushions, preferably of the fluid actuated type, are provided.

For instance, in a die for producing an automobile door, the outer members or rings constitute blank holding members which grip the material. The large inner members form the metal to shape the door, and after this large inner member has pressed the material into the shape of a door by traveling to the lowest point in its stroke, the smaller or aperture producing die or punch in the inner die member moves outward to form the window opening. For the purpose of actuating this smaller inner die or punch, to spot the same, fluid actuated cushions may be provided, thereby providing a supplementary action in a die spotting machine.

Such an arrangement renders it possible to spot all of the die members in their correct working positions simultaneously, whereas heretofore in the ordinary die spotting machine, the various members constituting a complete die, each have to be spotted individually, but they have never heretofore been spotted simultaneously.

The spotting of all of the members of the die simultaneously, assures their proper parallel relation to each other, both between the upper and lower members, as well as between the inner and outer members of the die.

A further object of the invention is to provide improved means to reproduce in a die spotting machine, the exact relationship between the punch and work holder that may be required in the work production press, without the necessity of the use of a number of varying spacer blocks, etc., and at the same time eliminate the necessity of providing two slides, as in a double action press.

To the attainment of these ends and the accomplishment of other new and useful objects as will appear, the invention consists in the features of novelty in substantially the construction, combination and arrangement of the several parts, hereinafter more fully described and claimed and shown in the accompanying drawings illustrating this invention, and in which

Figure 3—A is a view partly in section, partly in elevation and on an enlarged scale of the means for the cushion cylinders.

Referring more particularly to the drawings the numeral 25 designates the base or bed of the machine, projecting above which are uprights 26 and supported by the uprights is a crown 27. These parts constitute the frame of the machine and may be secured together in any desired or suitable manner. Supported by the uprights 26 are guides 28 upon which guides slide 29 is reciprocable and any suitable means may be provided for raising and lowering the slide.

In the present exemplification of the invention this is accomplished by means of fluid pressure. To that end there is secured to the slide, plungers 30, any number of which may be provided, and connected to each of the plungers is a piston (not shown) each movable in a cylinder 31. Leading into the top of the cylinders is a pipe 32 through which fluid from a pipe 32—A is supplied to the cylinders on one side of the piston, the fluid being delivered into the cylinders from a suitable source of supply 32—B, by means of a pump 33 operated by a motor 34, which motor is controlled in any suitable manner, well known in this art, by the operator.

The pipe 32—A is connected with a valve casing 32—C having a controlling valve 32—D, and connecting the valve casing 32—C with the pump 33 is a pipe 33—A, so that liquid may be forced from the supply 32—B by the pump to the top side of the pistons in the cylinder 31.

Leading into the bottom of the cylinders 31 is another pipe 35 which has connection with the pipe 33—A by means of a pipe 33—B on the discharge side of the pump 33, so that the fluid may be delivered under pressure into the cylinders beneath the piston to raise the slide 29, the fluid, as the piston rises, being discharged from the cylinder from the other side of the piston.

Leading from the valve casing 32—C is a pipe 36 which delivers the liquid back to the source of supply 32—B. Thus if the valve 32—D is set to permit the liquid to be delivered by the pump 33 through the valve casing into the pipe 32—A it will enter the cylinders above the piston and lower the slide 29, the liquid being discharged from below the pistons through the pipe 35 back to the supply through the pipe 33—B, pipe 33—A, valve casing 32—C and pipe 36.

When, however, the valve 32—D is set to direct the fluid from the pump 33 beneath the pistons to raise the slide 29, the fluid above the pistons will be discharged from the cylinders through the pipe 32, 32—A, valve casing 32—C and pipe 36 back to the source of supply. Thus by operating the valve 32—D, the operator may control the direction of flow of the fluid, and consequently the raising and lowering of the slide 29. The valve 32—D which controls the pump may be controlled in any suitable manner (not shown) and both may be located in any convenient position on the machine or arranged in any desired position. A suitable switch device 34—A is preferably provided for controlling the motor 34, and this may be mounted upon a portion of the machine frame and located in a position convenient for the operator.

With the mechanism thus far described, it will be manifest that when the fluid is forced into the cylinders on one side of the piston to move the latter, the fluid on the other side of the piston will be discharged to permit such movement of the pistons, and when it is desired to move the slide in the opposite direction, the direction of flow of the fluid is reversed, escaping from the side of the piston in the direction that the piston is moved.

In order to maintain the slide 29 horizontal and against tilting action, regardless of the point on the slide at which resistance pressure is exerted, and to cause the opposite side of the slide to be maintained level, there may be provided racks 37 which are secured by one end to the slide. Engaging with these racks 37 are pinions 38 connected to a shaft 39 journaled in suitable bearings 40; these racks and pinions are located in any suitable position with respect to the slide and any number may be provided. Therefore it will be manifest that inasmuch as the racks are connected to the slide and as pinions which mesh with the racks are connected together for simultaneous rotation by shaft 39, no matter at what point on the slide 29 resistance pressure is exerted, the racks and pinions will cause the slide to be maintained horizontal.

In the fitting of dies one of the dies is mounted upon the bed and the other co-operating die is connected to the slide for movement therewith so that after the surfaces of the die members are coated with chalk or bluing, the high points on the co-operating parts of the die members will cause spots, which latter are filed or ground off until a perfect fit of the dies is secured.

Heretofore the slide has usually been arrested in its movement toward the bed by contact of the high points of the die faces that are to be fitted, but if in the beginning of the spotting or fitting operation the slide should tilt even very slightly, then more than one point of contact is produced, with the result that the operator grinds or files more than one spot, instead of only the points which are protruding most, and the operation of obtaining a perfect fit of the dies is not satisfactory.

By providing, as in the present invention, a positive means for stopping or arresting the movement of the slide at the bottom of its stroke, beyond which it cannot move, and which stopping means is independent of the obstruction offered on the high spots of the die itself, it follows that only the highest points of the die will spot, so that the operator may only file or grind the highest points.

This arresting of the movement of the slide is produced, in the present exemplification of this invention, by providing positive stops which will arrest the movement of the slide.

Figure 7:
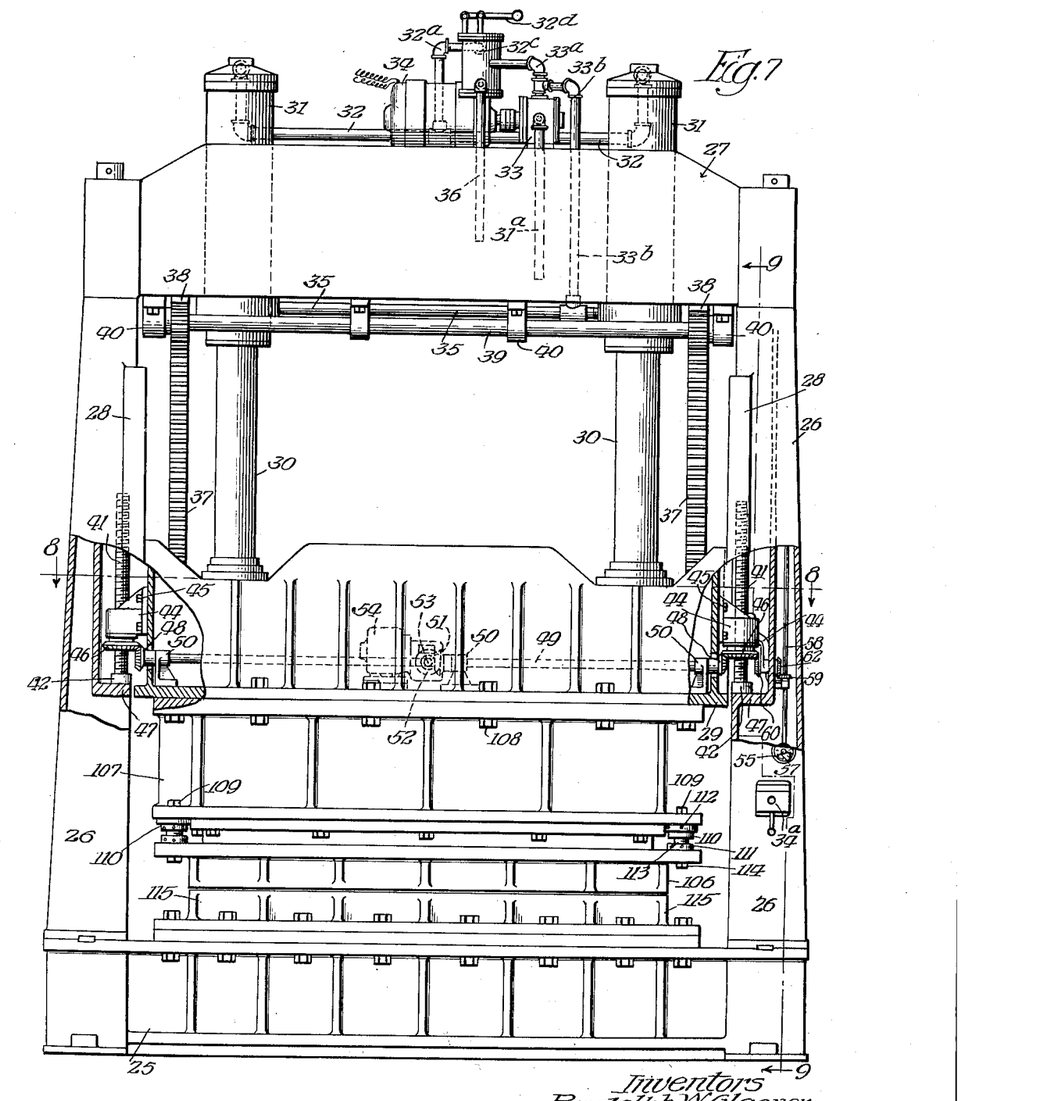
Figure 7 is a view similar to Figure 1 of another form of the invention.

To that end and in the form of the invention shown in Figure 7 adjustable stops are carried by the slide, one of the stops being preferably arranged at or adjacent each of the four corners of the slide. These stops engage shoulders and as the construction and operation of each of the stops is the same the description of one will apply to them all.

The stop consists of a screw 41 provided with a head 42 (see particularly Figure 10) and a nut or collar 43 through which the screw is threaded. The nut or collar is rotatively mounted in a bracket or bearing 44 secured in any suitable manner, such as by means of bolts or screws 45 to the slide 29, and secured to the nut or collar 43 for rotation therewith is a bevel gear 46 which also encompases the screw 41.

The uprights 26 are provided with a shoulder or abutment 47 with which the head 42 on the screw 41 contacts, the abutment 47 being disposed in the path of movement of the head 42 of the screw 41 in one direction of its movement with the slide 29, and the head 42 contacts the abutment at the bottom of the stroke of the slide. Thus it will be seen that when the head 42 and screw 41 are adjusted to a predetermined position with respect to the slide 29 and abutment 47, the slide 29 will be arrested in its movement in one direction.

To vary the time, in the cycle of operation of the movement of the slide, at which the head 42 will contact the abutment 47 to arrest or limit the movement of the slide toward the work, it is only necessary to adjust the screw 41 with respect to the slide.

This may be accomplished in any suitable manner, but the screws 41 and heads 42 should be simultaneously adjusted with respect to the slide so as to insure that they will have a uniform adjustment and the slide will be maintained against tilting.

This may be accomplished by means of a bevel gear 48 meshing with the bevel gear 46. The screws at the opposite ends of the slide in both the front and the back of the slide are preferably connected together in pairs by means of a shaft 49 connecting the respective bevel gears 48 of the pairs. These shafts are journaled in suitable bearings 60 carried by the slide 29.

Figure 8:
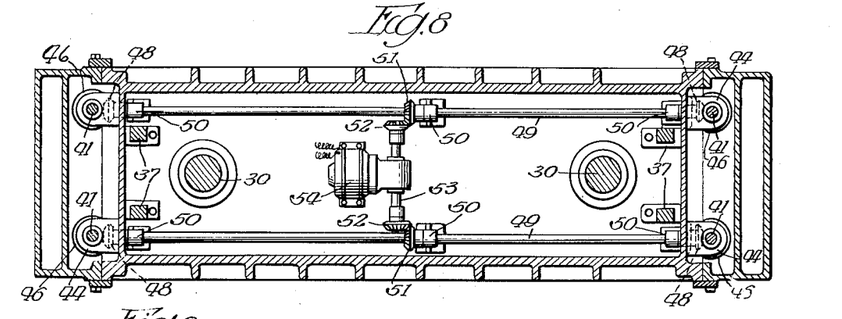
Figure 8 is a horizontal sectional view taken on line 8—8, Figure 7.
Figure 9:
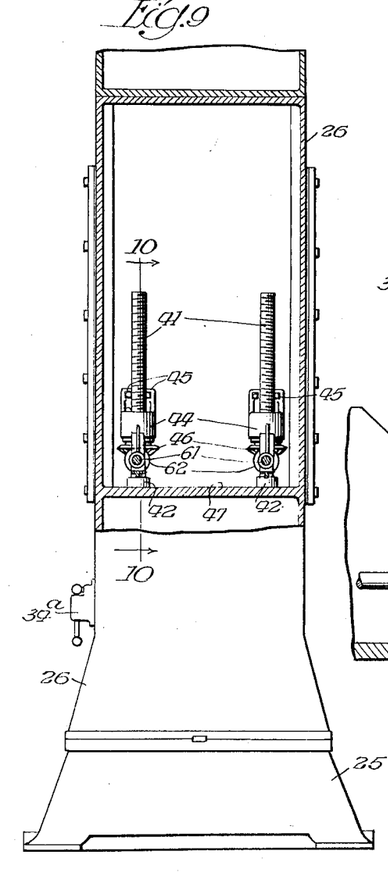
Figure 9 is a detail vertical sectional view, on an enlarged scale, taken on line 9—9, Figure 7.

With this arrangement there will be provided a pair of parallel shafts 49 one extending along the front and one along the back of the slide as shown more clearly in Figure 8.

Secured to each of the shafts 49 at any position thereon and for rotation therewith is a bevel gear 51 and meshing with each of these bevel gears is another bevel gear 52. The gears 52 are secured to a shaft 53 and this shaft 53 is operatively connected with the shaft of a motor 54 also carried by the slide. It will therefore be manifest that upon the operation of the motor 54 each of the shafts 49 will be rotated and they in turn through the connection of the bevel gears 46 and 48 will rotate the screw 41 simultaneously and to the same extent will simultaneously adjust the ends or heads 42 of the screws and move them into predetermined positions with respect to the slide 29 to contact the abutments 47 and thereby arrest the movement of the slide 29 at any predetermined time or point in the cycle of operation of the slide.

This motor may be controlled in any desired or suitable manner, and from any suitable point (not shown).

Figure 18:
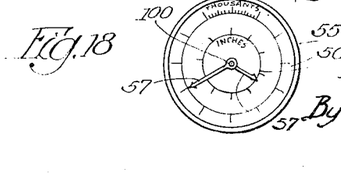
Figure 18 is an elevation of the dial by means of the use of which the movement of the slide may be indicated.

In order to indicate to the operator the extent of separation of the dies that he may desire, or the adjustment of the slide 29 with respect to the abutment or point in the cycle of operation of the slide at which the slide is to be arrested in its movement, an indicating dial 55 is provided, (see particularly Figure 18) graduated as at 56 to indicate inches and thousandths of inches of adjustment, or any other indications, with which pointers or fingers 57 co-operate. This dial may be arranged in any suitable position convenient for the operator, and the pointers or fingers may be operated in any suitable manner, suffice it to say that there is provided a shaft 58 which is operatively connected in any well known manner with the pointers or fingers, so that upon rotation of the shaft these pointers or fingers will be correspondingly moved over the face of the indicator.

Figure 10:
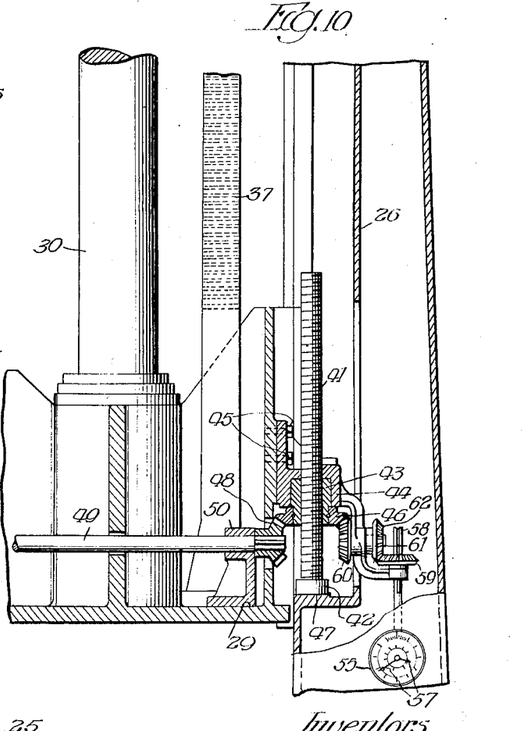
Figure 10 is a detail vertical sectional view taken on line 10—10, Figure 9 on an enlarged scale.
Figures 11, 12:
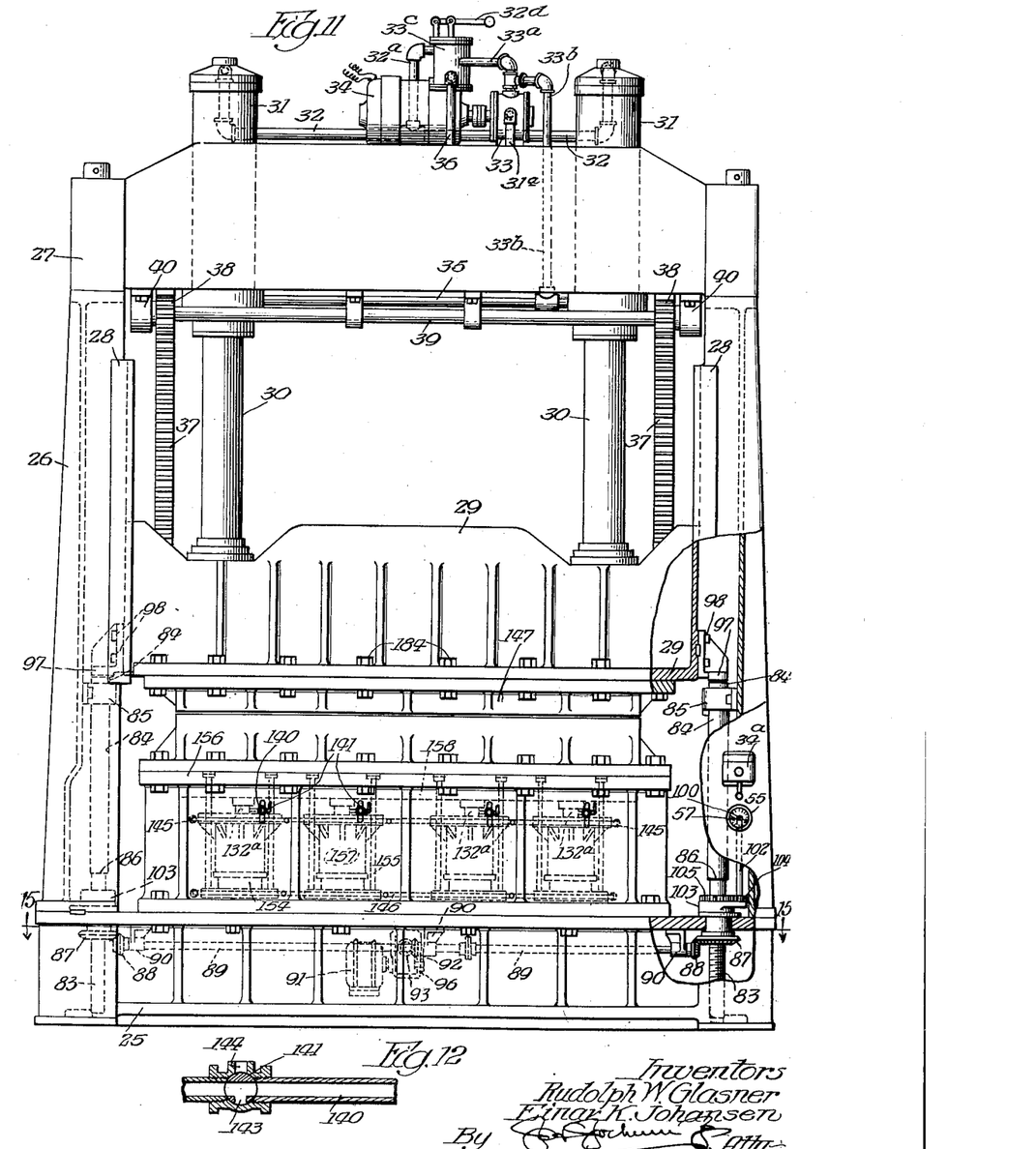
Figure 11 is a view similar to Figures 1 and 7 of still another exemplification of this invention.
Figure 12 is a sectional view of a portion of the fluid supply pipe and the control valve for the cushions.
Figure 13:
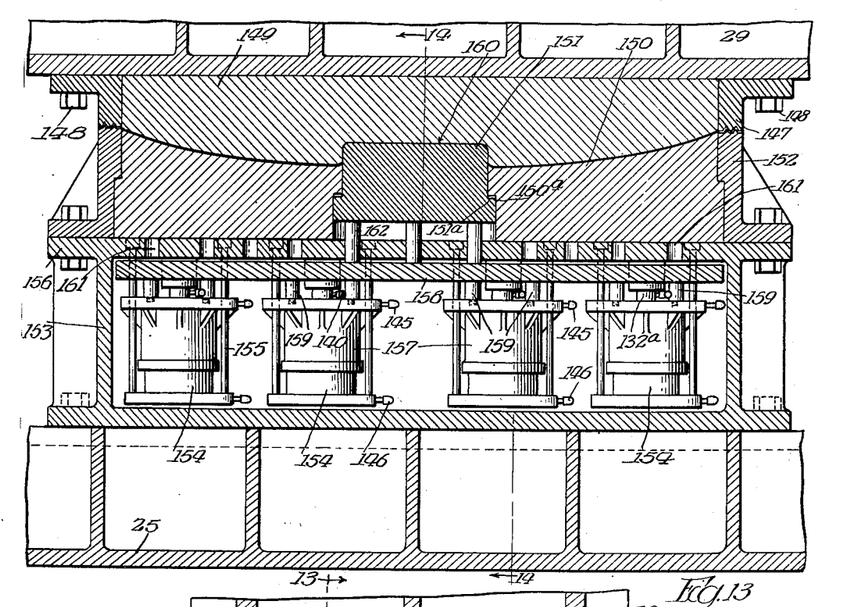
Figure 13 is an irregular vertical sectional view taken on line 13—13 Figure 14.
Figure 14:
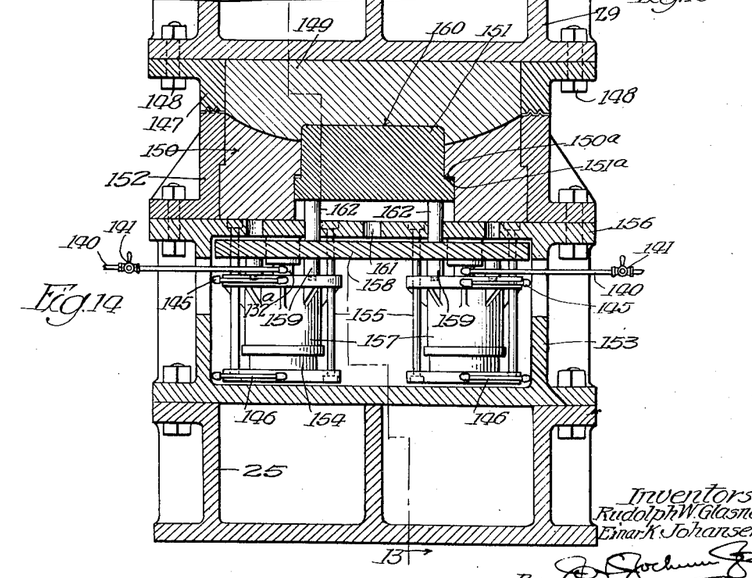
Figure 14 is an irregular vertical sectional view taken on line 14—14 Figure 13.
Figure 15:
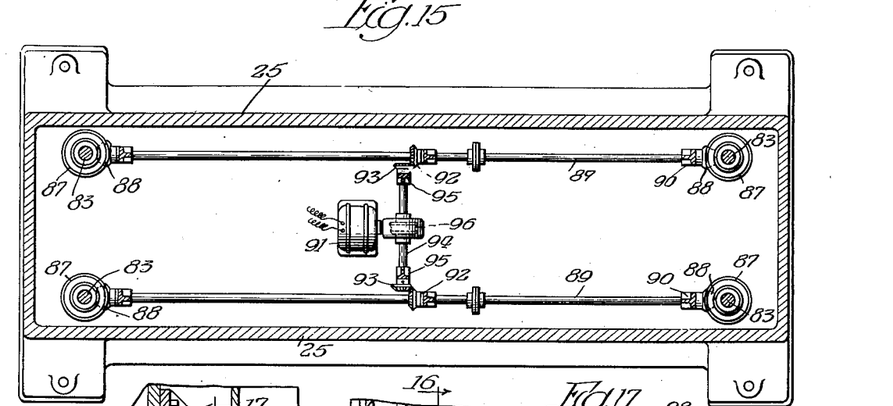
Figure 15 is a horizontal sectional view taken on line 15—15 Figure 11.
Figure 16:
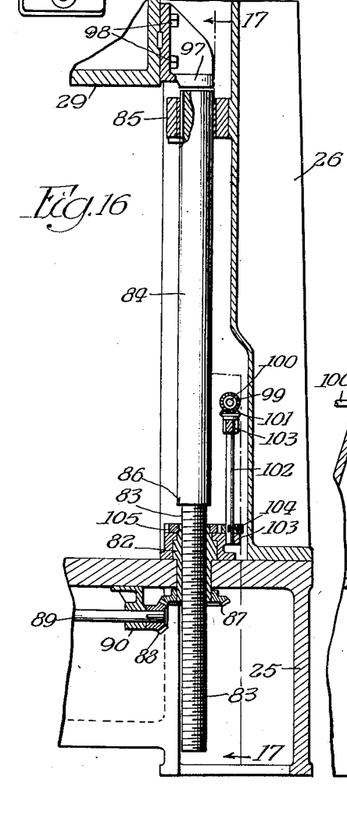
Figure 16 is a detail sectional view taken on line 16—16 Figure 17.
Figure 17:
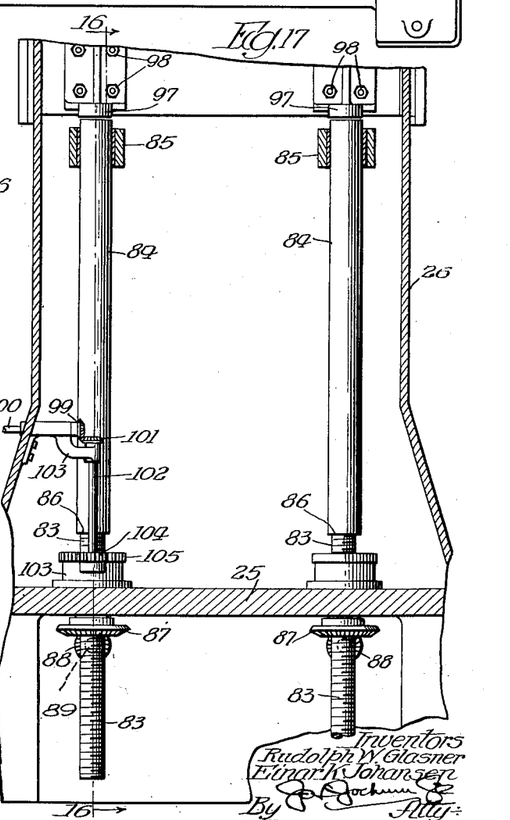
Figure 17 is a vertical sectional view taken on line 17—17 Figure 16.

In the form of the invention shown in Figures 7 and 10 the shaft 58 is suitably mounted in bearings and operatively connected with the shaft so as to rotate the same, is a bevel gear 59. This gear 59, however, is adapted to move upon and lengthwise of the shaft 58, so that the gear may be bodily moved with the slide 29 and will travel lengthwise of the shaft 58. This gear 59 is mounted in suitable bearings upon and so that it will travel with the slide 29. Meshing with the gear 46 is a bevel gear 60 secured to a shaft 61 to rotate therewith and secured also to the shaft 61 to rotate therewith is another bevel gear 62, which latter meshes with the bevel gear 59.

Thus it will be seen that when the bevel gear 46 is rotated, the bevel gear 59 will also be rotated through the medium of the interconnecting gears. This will rotate the shaft 58, while at the same time the gear 59 will be able to slide upon the shaft 58, with the movement of the slide of the shaft being maintained against bodily movement.

In the form of the invention shown in Figures 1 to 6, the stop mechanism instead of being carried by the slide 29 is carried by the crown 21 of the machine, and to that end there is secured to each corner of the slide an upright bar or rod 63, one end of which is anchored as at 64 in any suitable manner to the slide 29. The bars project upwardly through the crown and through a hollow or tubular sleeve or member 65, the outer periphery of which is screw threaded. The end of the rod 63 projects beyond the end of the member 65, and is provided with a head 66 that is adapted to abut the end of the member 65, the rod being adapted to slide freely through the member 65.

Rotatively mounted upon the crown 27 is a nut or collar 67 that is threaded upon the hollow member or sleeve 65, the nut or collar 67 being maintained against bodily movement, so that when it is rotated, the sleeve or member 65, by reason of its threaded engagement with the nut or collar, will be moved longitudinally therethrough. Secured to the nut or collar 67 for rotation therewith is a bevel gear 68 with which a bevel gear 69 meshes. The gear 69 at each end of the machine at the front and the back of the machine, are connected by means of a shaft 70 to cause them to rotate in unison, and this shaft is mounted in suitable bearings 71.

The shafts 70 may be caused to rotate in unison, in any desired or suitable manner but preferably by means of a shaft 72 arranged along either the front or back of the crown and is journaled in suitable bearings 73. Secured to this shaft 72 and at each end thereof is a bevel gear 74, and each of these bevel gears 74 meshes with a bevel gear 75 secured to each of the shafts 70 so that, in order to simultaneously adjust or position the sleeves or hollow members 65 by moving them longitudinally with respect to the crown, and through the nuts or sleeves 67, it is only necessary to rotate the shaft 72.

This rotation may be accomplished in any suitable manner preferably by means of a motor suitably mounted and controlled in any suitable manner and from any desired point (not shown).

The motor 75—A may be connected with the shaft 72 in any suitable manner, preferably by means of reduction gears diagrammatically represented at 76, and couplings 77 may, if desired, be provided between the shaft 72 and the motor.

Thus it will be seen that inasmuch as the rods 63 are connected to the slide 29, the extent of the lowering movement of the slide will be controlled by engagement of the heads or shoulders 66 on the rods with proximate end of the sleeves or tubular member 65 which form abutments. Therefore, in order to vary or to change the point in the cycle of operation of the slide at which it will be arrested or stopped in its lowering movement, it is only necessary to adjust the sleeve or tubular member 65 to a predetermined point or position at which it is desired that the slide shall be arrested in its movement by the engagement of the head or shoulder 66 with the end of the member 65.

Obviously the members 65 at the four corners of the slide may be coupled together in any desired or suitable manner to produce a simultaneous and equal adjustment of the sleeves or members 65.

In this form of the invention the dial or indicator shaft 58 is operated from a bevel gear 75 through the medium of a bevel gear 78 which meshes with the gear 75. The shaft of the gear 78 is journaled in a suitable bearing 79 and a bevel gear 80 is connected with the bevel gear 78 for rotation therewith. This bevel gear 80 in turn meshes with another bevel gear 81 that is secured to the shaft 58 for rotation therewith.

Thus it will be seen that when the shaft 72 is is rotated to adjust the tubular member or sleeve 65, the bevel gear 75 will rotate the shaft 58 through the medium of the intermediate gears 78, 80 and 81.

By adjusting the sleeve or tubular member 65, the end thereof which forms the abutment or stop against which the head 66 on the rods 63 engage, may be moved to a predetermined position to arrest the downward movement of the slide 29, and the extent of adjustment or point at which the slide is to be arrested in its downward movement will be indicated upon the dial or indicator 55.

Obviously the shaft 58 will be provided with the necessary or suitable bearings.

In the form of the invention shown in Figures 11 to 17, the stop mechanism is supported by the bed of the machine, and to that end there is rotatively supported by the bed, a nut or sleeve 82 into which is threaded the reduced threaded end 83 of a bar or rod 84, the latter being slidable through a suitable bearing 85 supported by the frame of the machine.

The reduced portion 83 of the rod forms a shoulder 86 which will serve as a means for limiting the endwise movement of the rod 84 in one direction.

Connected with the sleeve or nut 82 for rotation therewith is a bevel gear 87 with which a bevel gear 88 meshes, and this gear 88 is secured to a shaft 89 for rotation therewith and which shaft is journaled in suitable bearings 90. These shafts 89 may be arranged in any suitable manner so that the rods or members 84 at the four corners of the bed will be simultaneously adjusted and in the present exemplification one is shown extending across both the front and rear of the machine and operatively connected to opposite bevel gears 87 through the medium of the bevel gears 88.

These shafts 89 may be simultaneously rotated in any suitable manner from a common motor 91, suitably located, and the motor together with the shafts 89 are preferably located within the base 25 of the machine, and which base is hollow.

Connected to each of the shafts 89 is a bevel gear 92 suitably located, and meshing with each of these gears 92 is a bevel gear 93. The gears 93 are secured to a shaft 94 and this shaft 94 is journaled in suitable bearings 95 and is connected to the shaft of the motor 91 through the medium of connecting or reduction gearing 96.

The motor 91 is controlled in any desired or suitable manner and from any suitable point.

It will thus be seen that with this form of the invention when the motor is operated the nuts or collars 82 will be simultaneously rotated to simultaneously and equally adjust the bars or rods 84 longitudinally.

Carried by the slide 29 and adjacent the end of each of the bars or rods 84 is a bracket 97 secured in position in any suitable manner such as by bolts or screws 98.

As the slide is lowered and when the bars or rods 84 have been adjusted to position the extremities thereof at a predetermined point at which it is desired to arrest the lowering movement of the slide, one of these brackets 97 will abut the extremity of the proximate rod 84 and the movement of the slide will be arrested.

By thus adjusting the bars or rods 84 it will be manifest that the slide may be arrested at any predetermined or given point in its lowering movement.

In this form of the invention the pointers or indicators 57 on the dial or indicator 55 are operated by a gear 99 secured to the arbor or shaft 100 of the indicator. Meshing with this gear 99 is a bevel gear 101 secured to a shaft 102 for rotation therewith and this shaft 102 is journaled in suitable bearings 103. Secured to the shaft 102 for rotation therewith is a gear 104 which meshes with the gear 105 that is secured to the sleeve or nut 82 for rotation therewith and which gear 105 encompasses the threaded portion 83 of the bar or rod 84.

Thus it will be seen that when the motor 91 is operated to position the bars or rods 84 by rotating the nut or sleeve 82, the pointers or indicators 57 of the dial 55 will also be rotated to indicate the adjustment or positioning of the parts at which the brackets 97 will abut the ends of the rod 84, through the medium of the gear connections including the elements 105, 104, 102, 101, 99 and 100. It will also be manifest that the adjusting mechanism is protected by being disposed within a hollow portion of the frame of the machine.

The dies to be spotted are secured respectively to the bed 25 and slide 29 either in direct contact therewith or through the medium of an intermediate member, if it is desired to spot both the inner and outer die at the same time.

In the forms of the invention shown in Figures 1 to 7 there is shown an outer die member 106 carried by the slide with an intermediate member 107 which is secured directly to the slide in any suitable manner such as by means of fastening bolts 108. The die member is connected to the intermediate member by means of an adjustable connecting means such as expansible nuts, each comprising a bolt 109 secured to the member 107 and the die 106. Encompassing this bolt is a nut or member 110 which contacts with the face of the member 107, and a nut member which contacts with the face of the die 106 and is threaded into the nut or collar 110. By adjusting the elements 110 and 111 with respect to each other it will be manifest that they may be separated or brought together to determine the position of the die 106. This adjustment may be accomplished by means of apertures 112 and 113 in the respective elements into which an adjusting tool may be inserted.

Obviously when the elements 110 and 111 are moved toward each other to draw the die 106 or any portion thereof toward the member 107 the nut 114 or the bolt 109 will be correspondingly adjusted.

Thus it will be seen that the die member 106 may be properly adjusted or positioned with respect to the die member 115 that is secured to the base 25.

In dies where there is provided an inner die member such as the die member 116 (see particularly Figures 2 and 3) to perforate the work, such as to form a door or window opening, this die can be spotted at the same time as the die member 117 in which the die member 116 operated. The die member 117 is anchored to the member 107, when the latter is employed, by means of suitable anchoring bolts 118 and the dies 117 as well as the work holder 106, which also might serve as a die, may be relatively adjusted by the expansible nuts or elements 110 and 111. The work holder 106 and the die 117 may, if desired, be provided with co-operating shoulders 119 to prevent the die 117 from dropping out of place.

The work holder 106 co-operates with the work holder 115 secured to the base 25 and the die 117 co-operates with the die 121, the work holders 106 and 115 holding the work while the dies 117 and 121 give the work the necessary shape or contour.

Thus it will be seen that these dies 117 and 121 may be spotted by lowering the slide, after the surfaces of the dies have been treated or coated as is usual in die spotting machines, until the dies are brought into contact to produce the spots, after which the slide 29 is raised and the high spots filed and ground off.

The extent of the lowering movement of the slide 29 is limited and the slide is arrested at the bottom of its stroke by stop devices already described.

In order to spot the die 116 at the time that the dies 117 and 121 are spotted, the die 116 may be lowered or brought into contact with its co-operating die or surface by independently moving the die 116 after the die 117 has been moved into contact with its co-operating die 121 to spot these two dies. This lowering movement of the die 116 may be accomplished in any suitable manner but preferably by fluid actuated devices.

To that end there may be arranged within the hollow member 107 fluid actuated devices such as cylinders and pistons, any number of which may be provided and which may be arranged in any desired or suitable manner, and as the construction and operation of all of these cylinders and pistons is the same the description of one will apply equally as well to them all.

Figure 1:
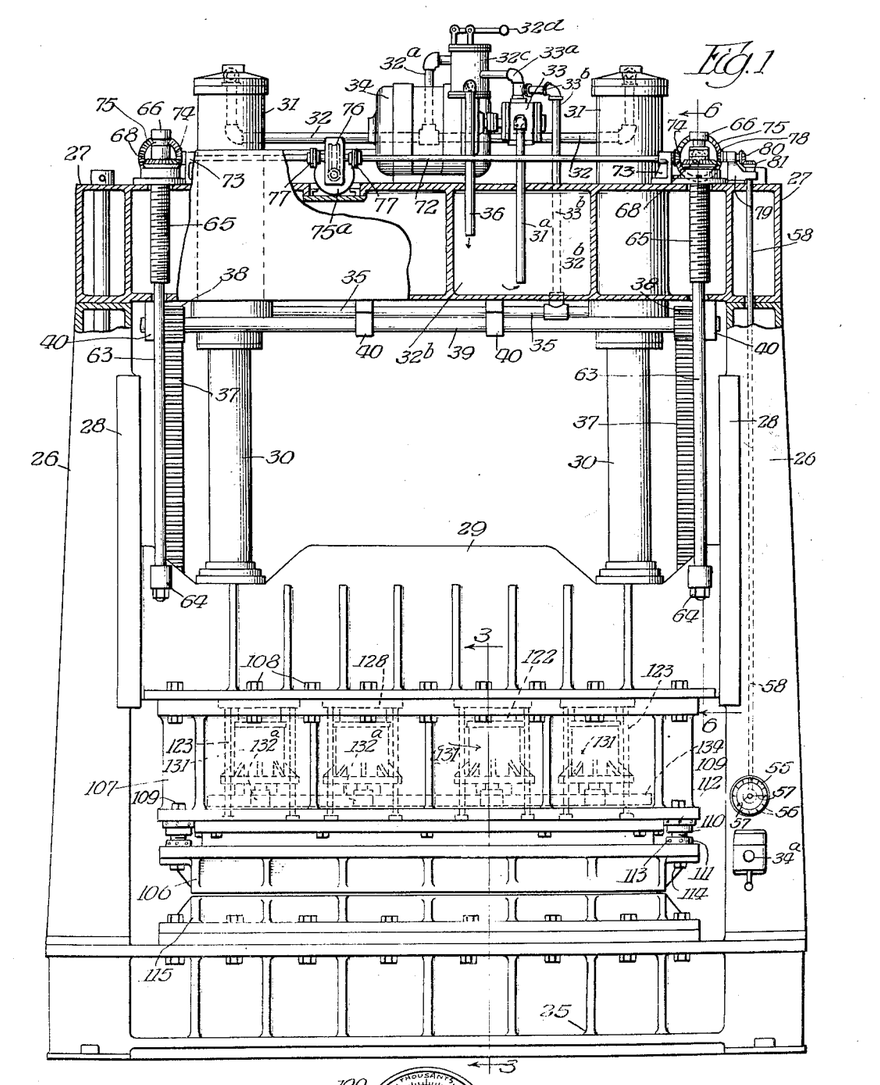
Figure 1 is a view partly in front elevation, partly broken away, and partly in section, of one adaptation of a die fitting machine constructed in accordance with the principles of this invention.
Figure 2:
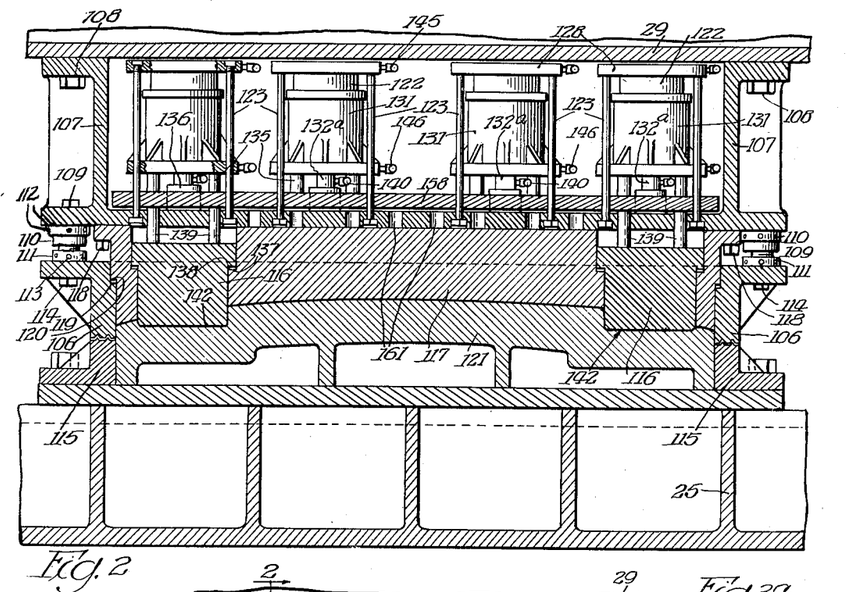
Figure 2 is a detail vertical sectional view on an enlarged scale as taken on line 2—2, Figure 3.
Figure 3:
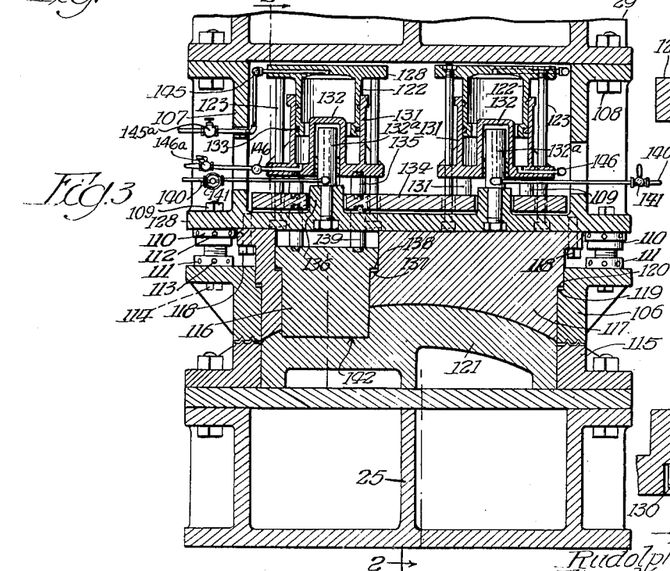
Figure 3 is a detail vertical sectional view taken on line 3—3, Figure 1 on an enlarged scale.
Figure 3A:
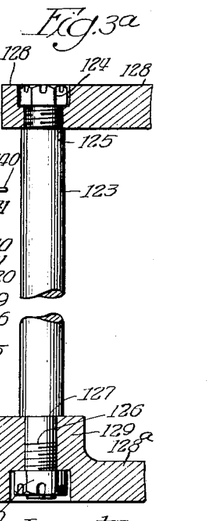
Figure 4:
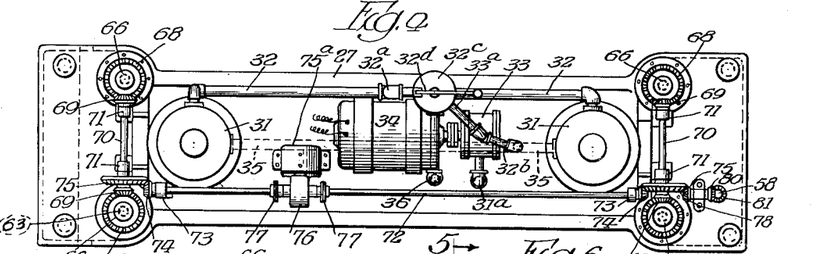
Figure 4 is a top plan view of Figure 1.
Figure 5:
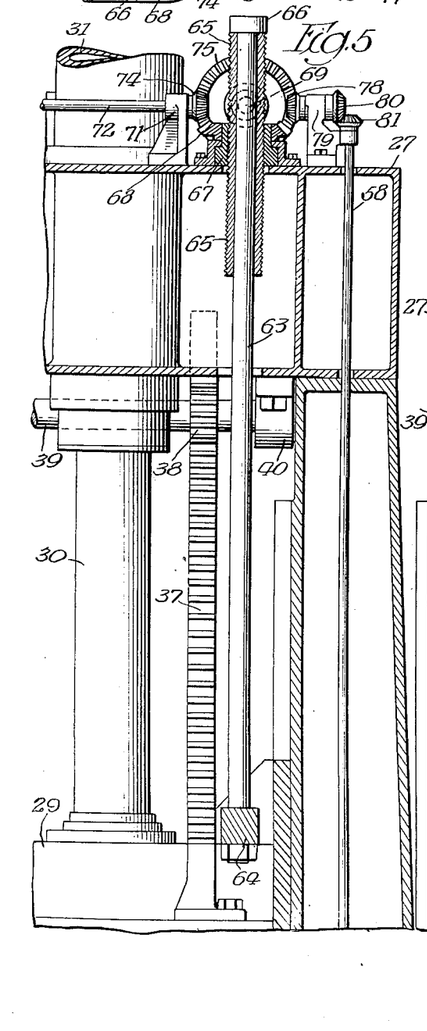
Figure 5 is a detail vertical sectional view taken on line 5—5, Figure 6.
Figure 6:
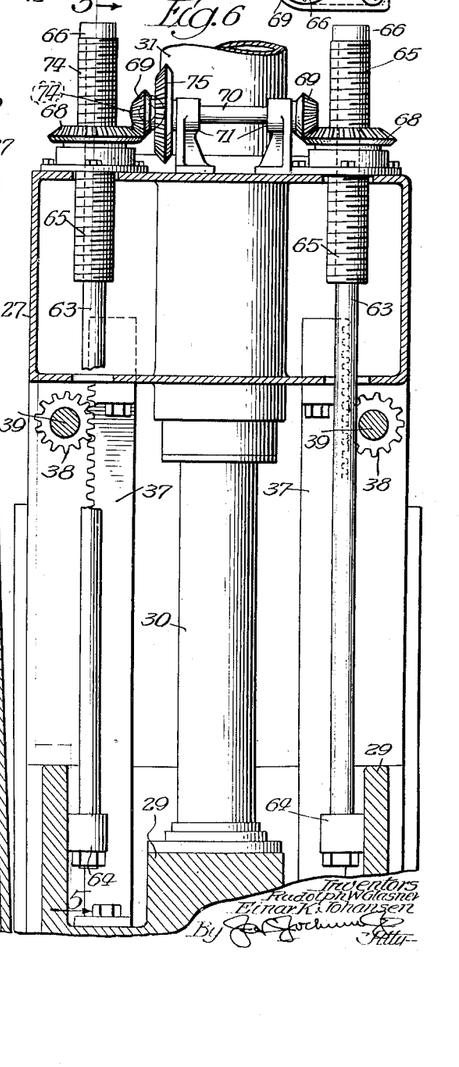
Figure 6 is a detail vertical sectional view, on an enlarged scale, taken on line 6—6, Figure 1.

In the form of the invention shown in Figures 1, 2 and 3 the numeral 122 (see particularly Figures 2 and 3) designates a stationary cylinder member held in position in any suitable manner, such as by means of tie rods 123, the upper end of which is reduced and threaded as at 124 to provide a shoulder 125, and similarly the lower end is reduced and threaded as at 126 to provide a shoulder 127. The reduced portion 124 passes through a flange 128 on the cylinder member 122 and a nut is threaded upon the reduced end 124 to clamp the flange 128 between the nut and shoulder 125. The lower reduced end 126 passes through the base 128—A of the member 127 or a boss 129 and is engaged by a nut 130 which co-operates with a nut on the end 124 to clamp these parts together and to hold the cylinder 122 against movement with respect to the member 107. The lower end of the cylinder 122 is open and telescopes into another cylindrical member 131. Carried by this cylindrical member 131 and arranged centrally thereof is a hollow piston member 132 which is closed at its top and this piston member is of an external diameter considerably less than the internal diameter of the cylinder 122 in which the piston 132 moves. Suitable packing is provided between the parts.

The piston member 131 and 132 is supported by means of a pressure plate or pad 134 which is arranged within the hollow member 107 and normally rests upon the bottom 128 thereof. Pins 135, any number of which may be provided may be disposed intermediate the end of the piston member 131 and are connected to the piston as well as to the pressure plate or pad 134, and these pins 135 may, if desired, be secured in any suitable manner. With this construction, when the fluid pressure is admitted through the pipe 140, the die 116 and cylinder 131 will be raised, and such fluid will be exhausted when the cylinder 131 is lowered, the valve 141 controlling the inlet and outlet of the fluid.

The plate or pad 134 may be guided in its movement within the member 107 in any suitable manner such as by means of bosses 136 carried by the bottom 128 of the member 107, or in any suitable manner so as to maintain it at all times level but not interfere with its free movement.

In the event that the pins 135 are omitted and to cause the piston member to abut the plate 134 the latter will obviously be of a thickness greater than the height of the bosses 136.

The die 116 may be maintained against dropping out of position with respect to the die 117 by means of co-operating shoulders 137 and 138. Pins 139 are supported by the die 116 and pass freely through the bottom 128 of the member 107 and contact the pressure pad or plate 134.

Fluid pressure is admitted into the cushioning devices from any suitable source through a pipe 145 having a valve 145—a therein and which fluid discharges into the cylinder 131 beneath the piston 128 to cause the cylinder 131 to move downwardly so that the face of the die 116 will contact with the co-operating face 142 of the die 121 to spot these two die faces. The hollow stem 132—a projects into the piston and a pipe 140 having a valve 141 serves, when the cylinder 131 is forced downward, to permit air to be exhausted from the hollow piston 132. This valve 141 may be of the 2-way type or any other suitable construction and may be controlled by an operating handle, so as to control the outlet and inlet of fluid out of and into the hollow piston 132. When the pad 134 is forced downwardly, the die 116, through the medium of the pins 139, will be forced beyond the face of the die 117 so that the face of the die 116 will contact with the co-operating face 142 of the die 121 to spot these two die faces. Admission of fluid under pressure into the hollow piston 132 through the pipe 140 will, when such pressure exceeds the pressure in the cylinder 131, hold the latter and the pressure pad 134 against falling.

When the slide then raises, both of the dies 116 and 117 will be raised.

The pipe 140 and valve 141, serve as a vent to allow the air to enter and escape as the cushion moves up and down on the stem 132—A, and into which stem the pipe is threaded, so that there will be no air trapped in the pocket or hollow piston 132, in which the stem or guide moves as the piston is raised or lowered.

Lubrication may be supplied from any suitable source through a supply pipe 145, and in the event any of the lubrication should escape and enter the cylinders, it may be drained off through a discharge pipe 146 having a valve 146—A therein.

In Figure 2 of the drawings two of these inner or supplementary dies are shown in connection with the die 117. In the form of invention shown in Figures 11 to 14 the supplementary or inner dies are shown in connection with the outer die that is mounted upon the bed 25 of the machine.

In this form of the invention the work holder 147 is secured by means of fastening devices 148 directly to the slide 29, and the inner die 149 is also secured to the slide in any suitable manner.

The bottom die 150 and the inner die 151 as well as the work holder 152, which latter co-operates with the work holder 147, are mounted upon the bed of the machine, the dies being supported by an intermediate member 153 which is hollow.

Within the hollow member 153 are arranged fluid pressure controlled members similar to those described in connection with the form of the invention shown in Figures 1 to 3, that is, where the fluid pressure controlled means is carried by the slide. In this latter form of the invention, however, the fluid pressure controlled means is reversed, that is, the cylinder members 154 are anchored by means of the rods 155 to the top 156 of the intermediate member 153, while the movable member 157 supports the pressure pad or plate 158. The pad may rest directly upon the top of the member 157 or intermediate pins 159 may be disposed between the pad or plate and the movable members so that the pad or plate will be supported thereby.

The pad or plate 158 is guided in its movement within the member 153 in any suitable manner so as to prevent it from tilting during its movement.

In this form of the invention as well as in the forms of the invention where the pressure pad or plate is carried by the slide, the pad or plate is of such a size that it will control or operate an inner die 151 or a plurality of inner dies, regardless of the position that it or they are placed with respect to the die 150.

When the dies 151 are employed the die 149 will be provided with co-operating faces 160.

In order to accommodate or control the movement or projection of the die 151 beyond the face of the die 150, regardless of the position of the die 151 with respect to the die 150, the top 156 of the intermediate member 153 may be provided with apertures 161 there-through and through which apertures pins 162, which rest upon the pad or plate 158, project, to contact the lower face of the die 151, whereby the die 151 may be projected beyond the face of the die 150 when fluid is admitted into the fluid pressure members, and which fluid pressure is admitted into the cushions or fluid pressure members and exhausted therefrom in the manner already described.

Thus it will be seen that no matter where the inner or supplemental dies may be disposed, or no matter what their size may be, the pressure pad 158 will be in a position to control the operation of the dies 151.

It will be manifest that with this invention the dies may be spotted and the movement of the slide limited or arrested at any predetermined point in the cycle of the operation of the slide, by adjusting the stops to limit such movement, and it will also be obvious that the pressure pad will not only be guided in the bed or on the slide, according to the form of the invention adopted but a reasonable accuracy will be given for parallel movement of the inner part of the dies.

Furthermore it is possible to reproduce in a spotting machine embodying this invention the exact relationship between the punch and the work holder that will be required in a production press, and without the necessity of using varying spaced blocks, and at the same time eliminate the necessity of providing two slides, as in a double action press.

By the use of the stops for limiting the movement of the slide it will be manifest that only the high points of the dies will be brought into contact at the limit of the movement of the slide, and the dies will be more accurately fitted.

While the preferred forms of the invention have been herein shown and described, it is to be understood that various changes may be made in the details of construction and in the combination and arrangement of the several parts, within the scope of the claims, without departing from the spirit of this invention.

What is claimed as new is:

1. A die fitting machine embodying a frame, a stationary die mounted upon the frame, a movable die, means for moving and means for limiting movement of the movable die toward the stationary die, the last said means embodying a plurality of sets of units, the units of one of said sets embodying two elements one of which is vertically adjustable with respect to the other, the units of the other of said sets constituting an abutment for the respective said adjustable elements, one of said sets of units being mounted upon the frame with the said stationary die, and the other of said sets of units being mounted upon the movable die support for movement therewith, and means for simultaneously adjusting the said adjustable elements at will, the last recited means being mounted upon the same part of the machine upon which the units containing the said adjustable elements are mounted.

2. A die fitting machine embodying a stationary bed and die, a slide, a die carried by the slide, means for moving said slide towards and away from the stationary die, means for limiting the movement of said slide towards the stationary die, the last recited means embodying two units one of which embodies a vertically adjustable sleeve and the other of which units constitutes a stop slidable through the sdeeve, the end of the sleeve constituting an abutment for the stop, one of the said units being mounted upon the slide and the other being mounted upon a stationary part of the machine, and means for adjusting said sleeve at will, the last recited means being mounted upon the same part of the machine upon which the said unit containing the adjustable sleeve is mounted.

3. A die fitting machine embodying a stationary bed and die, a slide, a die carried by the slide, means for moving said slide towards and away from the stationary die, means for limiting the movement of said slide towards the stationary die, the last recited means embodying two units one of which embodies a vertically adjustable sleeve and the other of which units constitutes a stop slidable through the sleeve, the end of the sleeve constituting an abutment for the stop, one of the said units being mounted upon the slide and the other being mounted upon a stationary part of the machine, and means for adjusting said sleeve at will, the last recited means being mounted upon the same part of the machine upon which the said unit containing the adjustable sleeve is mounted.

4. A die fitting machine embodying a stationary die, a movable die, means for moving and means for limiting the movement of the movable die towards the stationary die, the last said means embodying two units, one of said units embodying two elements one of which is vertically adjustable with respect to the other, the other of said units constituting an abutment for the said adjustable element, one of said units being associated with the said stationary die, the other of said units being associated with the movable die, means for adjusting the said adjustable element at will, the last recited means being associated with the same die with which the said adjustable element is associated, one of said dies comprising an inner and an outer die, means adjustably mounting the outer die upon its support, and means for effecting a movement of the inner die independently with respect to the outer die.

5. A die fitting machine embodying a stationary die, a movable die, means for moving and means for limiting the movement of the movable die towards the stationary die, the last said means embodying two units, one of said units embodying a sleeve rotatable on a vertical axis and an adjustable element passing through said sleeve, the other of said units constituting an abutment for the said adjustable element, one of said units being associated with the said stationary die, the other of said units being associated with the movable die, means for rotating said sleeve, and cooperating means between said sleeve and said element to produce adjustment of said element upon rotation of said sleeve, the last said means being supported upon the same part of the machine upon which the said adjustable element is supported.

6. A die fitting machine embodying a stationary die, a movable die, means for moving and means for limiting the movement of the movable die towards the stationary die, the last said means embodying two sets of units, the units of one of said sets each embodying two elements one of which is vertically adjustable with respect to the other, each of the units of the other set constituting an abutment for the adjustable element of the respective units of the other set, one of said sets of units being associated with the said stationary die and the units of the other set being associated with the movable die, and means for simultaneously and concomitantly adjusting the said adjustable elements, the last recited means being associated with the same die with which the said adjustable elements are associated.

7. A die fitting machine embodying a stationary die, a movable die, means for moving and means for limiting the movement of the movable die towards the stationary die, the last said means embodying two sets of units, the units of one of said sets each embodying two elements one of which is vertically adjustable with respect to the other, each of the units of the other set constituting an abutment for the respective adjustable elements of the other set of units, one of said sets of units being associated with the said stationary die and the other set of units being associated with the movable die, means for simultaneously and concomitantly adjusting the said adjustable elements, the last recited means being associated with the same die with which the said adjustable elements are associated, and means adapted to be set by the actuation of the said adjustable elements to indicate the extent of such adjustment.

8. A die fitting machine embodying a stationary bed and die, a slide, a die carried by the slide, means for moving said slide towards and away from the said stationary die, means for limiting the movement of said slide towards the stationary die, the last recited means embodying two sets of units, each of the units of one set embodying a vertically adjustable sleeve, each of the units of the other set embodying a stop slidable through the sleeve, the end of the sleeve constituting an abutment for the stop, the units of one of said sets being mounted upon the slide and the units of the other set being mounted upon a stationary part of the machine, and means for simultaneously adjusting the said sleeves, the last recited means being mounted upon the same part of the machine upon which the said units containing the adjustable sleeves are mounted.

9. A die fitting machine embodying a stationary bed and die, a slide, a die carried by the slide, means for moving said slide towards and away from the said stationary die, means for limiting the movement of said slide towards the stationary die, the last recited means embodying two sets of units, each of the units of one set embodying a vertically adjustable sleeve and each of the units of the other set embodying a stop slidable through the sleeve, the end of the sleeve constituting an abutment for the stop, the units of one of said sets being mounted upon the slide and the units of the other set being mounted upon a stationary part of the machine, means for simultaneously adjusting the sleeves, the last recited means being mounted upon the same part of the machine upon which the said units containing the adjustable sleeves are mounted, and the means adapted to be set by the actuation of the adjusting means for the said sleeves to indicate the extent of adjustment of the sleeves.

10. A die fitting machine embodying a stationary die, a movable die, means for moving and means for limiting the movement of the movable die towards the stationary die, the last said means embodying two sets of units, the units of one of said sets each embodying two elements one of which is vertically adjustable with respect to the other, each of the other set of units constituting an abutment for one of the adjustable elements, one of said sets of units being associated with the said stationary die and the other set of units being associated with the movable die, means for simultaneously and concomitantly adjusting the said adjustable elements, the last recited means being associated with the same die with which the said adjustable elements are associated, and means responsive to the tendency of one end of the movable die to tilt, for causing the opposite end of the movable die to compensate such tendency, to maintain the die horizontal.

11. A die fitting machine embodying a stationary die, a movable die, means for moving and means for limiting the movement of the movable die towards the stationary die, the last said means embodying two sets of units, the units of one of said sets each embodying two elements one of which is vertically adjustable with respect to the other, each of the other set of units constituting an abutment for the respective adjustable elements of the other set of units, one of said sets of units being associated with the said stationary die, the other set of units being associated with the movable die, means for simultaneously and concomitantly adjusting the said adjustable elements, the last recited means being associated with the same die with which the said adjustable element is associated, and means responsive to the tendency of one end of the movable die to tilt, for causing the opposite end of the movable die to compensate such tendency, to maintain the die horizontal, the last recited means embodying gear and rack mechanism.

12. A die fitting machine embodying a stationary die, a movable die, means for moving and means for limiting the movement of the movable die towards the stationary die, the last said means embodying two sets of units, the units of one of said sets each embodying two elements one of which is vertically adjustable with respect to the other, each of the other sets of units constituting an abutment for the respective adjustable elements of the other set of units, one of said sets of units being associated with the movable die, the other set of units being associated with the stationary die, means for simultaneously and concomitantly adjusting the said adjustable elements, the last recited means being associated with the same die with which the said adjustable elements are associated, an inner die within one of the aforesaid dies, and fluid pressure controlled cushioning means for the said inner die.

13. A die fitting machine embodying a stationary die, a movable die, means for moving and means for limiting the movement of the movable die towards the stationary die, the last said means embodying two sets of units, the units of one of said sets each embodying two elements one of which is vertically adjustable with respect to the other, each of the other set of units constituting an abutment for the respective adjustable elements of the other set of units, one of said sets of units being associated with the said stationary die and the other set of units being associated with the movable die, means for simultaneously and concomitantly adjusting the said adjustable elements, the last recited means being associated with the same die with which the said adjustable elements are associated, one of said dies comprising an inner and an outer die, means adjustably mounting the outer die upon its support, and means for effecting a movement of the inner die independently with respect to the outer die.

14. A die fitting machine embodying a stationary die, a movable die, means for moving and means for limiting the movement of the movable die towards the stationary die, the last said means embodying two sets of units, the units of one of said sets each embodying a sleeve rotatable on a vertical axis and an adjustable element passing through said sleeve, the units of the other of said sets constituting an abutment for the respective adjustable sleeves, one of said sets of units being associated with the said stationary die and the units of the other of said sets being associated with the movable die, and means for simultaneously rotating said sleeves for effecting a simultaneous adjustment of said adjustable elements, the last recited means being associated with the same die with which the said adjustable element is associated.

RUDOLPH W. GLASNER.
EINAR K. JOHANSEN.